United States Patent [19]

Arjunan

[11] Patent Number: 5,352,739
[45] Date of Patent: Oct. 4, 1994

[54] COMPATIBILIZATION OF ELASTOMER BLENDS

[75] Inventor: Palanisamy Arjunan, Houston, Tex.

[73] Assignee: Exxon Chemical Patents Inc., Linden, N.J.

[21] Appl. No.: 972,652

[22] Filed: Nov. 6, 1992

[51] Int. Cl.⁵ .................. C08L 51/00; C08L 51/04; C08L 11/00
[52] U.S. Cl. ........................ 525/75; 525/76; 525/80; 525/84; 525/86; 525/87
[58] Field of Search ............ 525/76, 213, 215, 222, 525/240, 75, 80, 84, 86, 87

[56] References Cited

U.S. PATENT DOCUMENTS

| | | | |
|---|---|---|---|
| 3,489,821 | 1/1970 | Witt et al. | 525/75 |
| 3,489,822 | 1/1970 | Witt et al. | 525/75 |
| 3,833,689 | 9/1974 | Usamoto . | |
| 3,950,281 | 4/1976 | Usamoto et al. | 525/215 |
| 4,230,833 | 10/1980 | Purvis | 525/260 |
| 4,234,703 | 11/1980 | Lindsay | 525/211 |
| 4,397,987 | 8/1983 | Cornell | 525/76 |
| 4,579,910 | 1/1986 | Giles, Jr. et al. | 525/148 |
| 4,605,704 | 8/1986 | Eastman et al. | 525/193 |
| 4,607,074 | 8/1986 | Hazelton et al. | 524/425 |
| 4,639,487 | 1/1987 | Hazelton et al. | 525/215 |
| 4,845,145 | 7/1989 | Hazelton et al. | 524/426 |
| 4,877,827 | 10/1989 | Van Der Groep | 524/477 |
| 4,908,411 | 3/1990 | Kinoshita et al. | 525/285 |
| 4,950,718 | 8/1990 | Burgert et al. | 525/185 |
| 5,140,072 | 8/1992 | Takeshita | 525/215 |
| 5,281,651 | 1/1994 | Arjunan et al. | 524/519 |

FOREIGN PATENT DOCUMENTS

| | | |
|---|---|---|
| 1096531 | 2/1981 | Canada . |
| 270247 | 6/1988 | European Pat. Off. . |
| 54-110255 | 8/1979 | Japan . |
| 4106554 | 8/1979 | Japan . |

*Primary Examiner*—James J. Seidleck
*Assistant Examiner*—M. L. Warzel
*Attorney, Agent, or Firm*—Catherine L. Bell

[57] ABSTRACT

This invention relates to a compatibilized rubber composition and a process for compatibilizing polar/nonpolar rubber blends comprising blending compatiblizers such as ethylene/vinyl acetate copolymer, ethylene/methacrylate copolymer EPDM or EP rubber grafted with a polar monomer such as methyl methacrylate.

12 Claims, No Drawings

COMPATIBILIZATION OF ELASTOMER BLENDS

BACKGROUND OF THIS INVENTION

1. Field of Invention

This invention is related to co-pending application U.S. Ser. No. 827,772, filed Jan. 29, 1992, now Pat. No. 5,281,651. This invention relates to the field of compatibilization technology. In particular, this invention relates to the use of ethylene copolymers including grafted EP and EPDM rubbers as compatibilizers for elastomer blends.

2. Description of the Related Art

A considerable amount of research has been made over the last several years with a view to obtaining new polymeric materials with enhanced specific attributes for specific applications or a better combination of different attributes. Much attention is currently being devoted to the simplest route for combining outstanding properties of different existing polymers, that is, formation of polymer blends. Although increasing numbers of miscible blends are reported in the literature [D. R. Paul et. al., J. Macromol. Sci., Rev. Macromol. Chem., C 18:109 (1980)], most polymers are nonetheless immiscible thus leading to heterophase polymer blends. In general, "compatibility (miscibility) is the exception, immiscibility is the rule" [Dobry and Boyer-Kawenski, J. Polymer Science, 2(1), 90–100 (1947)].

There are two widely useful types of elastomer blends: single phase and two phase blends. The single phase blend is miscible. The term miscibility does not imply ideal molecular mixing but suggests that the level of molecular mixing is adequate to yield macroscopic properties expected of a single-phase material.

The formation of two-phase elastomer blend is not necessarily an unfavorable event since many useful properties, characteristic of a single phase, may be preserved in the blend composition while other properties may be averaged according to the blend composition. Proper control of overall elastomer blend morphology and good adhesion between the phases are in any case required in order to achieve good mechanical properties. The elastomer blend components that resist gross phase segregation and/or give desirable blend properties are frequently said to have a degree of "compatibility" even though in a thermodynamic sense they are not "miscible". It should be emphasized that "compatibility" and "miscibility" are two different terms. Compatibilization means the absence of separation or stratification of the components of the polymeric alloy during the expected useful lifetime of the product (Gaylord, N. G., in "Copolymers, Polyblends and Composites", Advances in Chemistry Series 142, American Chemical Society: Washington, D.C., 1975, p. 76). "Technological compatibilization", according to Coran and co-workers [Rubber Chem. Technol., 56, 1045 (1983)] is "the result of a process or technique for improving ultimate properties by making polymers in a blend less incompatible; it is not the application of a technique which induces "thermodynamic compatibility", which would cause the polymers to exist in a single molecularly blended homogeneous phase".

It is well established that the presence of certain polymeric species, usually block or graft copolymers with the right structure, can indeed result in compatibilization of an immiscible elastomer blend because of their ability to alter the interfacial situation. Such, species as a consequence, are often referred to as "compatibilizers" or "interfacial agents" which is analogous to the term "solubilization used in the colloid field to describe the effect surfactants have on the ability to mix oil and water (McBain et. al., "Solubilization and Related Phenomena", Academic Press, New York, 1955). Such "compatibilizers" can be either preformed and added to the binary blend or formed "in situ" during the blending process.

The role of the compatibilizer in an elastomer blend is manifold: (1) reduce the interfacial energy between the phases, (2) permit a finer dispersion during mixing, (3) provide a measure of stability against gross segregation, and (4) result in improved interfacial adhesion (G. E. Molau, in "Block Copolymers", Ed by S. L. Agarwal, Plenum, N.Y. 1970, p. 79).

Two elastomers form a compatible mixture when they have at least one of the following characteristics:

- Segmental structural identity. For example, a graft or block copolymer of butadiene and styrene is compatible with either polybutadiene or polystyrene.
- Miscibility or partial miscibility with each other. Solubility parameter ($\delta$) difference < 1, generally <0.2 units. For example, poly (vinyl chloride), PVC, poly (ethylacrylate), PEA, poly (methylacrylate), PMMA, have solubility parameters in the 9.4–9.5 range and form compatible mixtures. Although, the structure of nitrile rubber, NBR is entirely different from those of PVC, PMMA, PEA, it has a similar solubility parameter 9.5 and is compatible with these three polymers.
- Functional groups capable of generating covalent, ionic, donor-acceptor or hydrogen bonds between the polymers.

Compatibilization of dissimilar elastomer blends is an area of active interest from both technological and scientific points of view. Many of the synthetic and natural elastomers have good properties that when combined with other rubbers of similar or complementary properties may yield desirable traits in the products.

Neoprene or polychloroprene rubber (CR) has been the material of choice in most power transmission belts, due to its unique combination of properties: oil resistance, toughness, dynamic flex life, good adhesion to other materials and heat resistance up to 100° C. In the past, CR belts have kept pace with the needs of the automotive industry, but recently there is a need for new materials for more demanding applications. First of all, CR belts are encountering greater heat duress in service due to increasing underhood temperatures (up to 150° C). Secondly, to meet automotive industry's longer warranty periods ("100,000 mile target"), the CR belts must have a lower failure rate with high mean life, even when high temperatures are not encountered. To meet these emerging needs, improvements in heat, ozone, and cut growth resistance of neoprene belts are desirable. The above requirement for neoprene belts could be satisfied by blending with polyolefin elastomers such as ethylene/propylene rubber (EP) or ethylene/propylene/diene terpolymer (EPDM) which have better heat/ozone and cut growth resistance. As such, however, these neoprene/EP or EPDM blends are incompatible.

It is known in the art that the resistance of cured unsaturated elastomers such as polybutadiene or polyisoprene to chemical attack from ozone and oxygen can be enhanced by forming a blend thereof with minor amounts of an ethylene/propylene/diene terpolymer and co-vulcanizing the blend. This development takes advantage of the inherent resistance of the olefin/diene terpolymer to chemical attack and imparts this property into co-vulcanized blend.

However, the use of olefin/diene terpolymers in blends with other elastomers is often limited to those other elastomers which have a mutual compatibility and comparable cure rate behavior with respect to the olefin/diene terpolymer. Thus, whereas highly unsaturated elastomers such as polybutadiene or polyisoprene may be, in some cases reasonably compatible with olefin/diene elastomers and may be readily co-vulcanized because of the high availability of sites of ethylenic unsaturation, other elastomers such as polychloroprene, and like materials containing polar groups along the chain and/or a relatively low degree of ethylenic unsaturation are not so readily co-vulcanized. In the case of blends with these latter elastomers, chemical resistance may be improved due to the influence of the olefin/diene terpolymer, but often at the expense of a lowering of physical properties such as tensile strength, elongation, modulus and/or abrasion resistance of the co-vulcanizate as compared with the cured elastomer itself.

Thus, it would be of great importance to the art if a compatibilizer for polar/nonpolar rubber blends such as CR/EPDM, CR/EP NBR/EPDM or NBR/EP could be found.

U.S. Pat. No. 4,397,987 to Cornell discloses nitrile rubber blended with an EPDM grafted with methacrylate monomer, preferably methyl methacrylate with minor amounts of ungrafted EPDM being present in the final resin. The EPDM-g-PMMA however is present as a modifier not as a compatibilizer.

U.S. Pat. No. 4,908,411 to Kinoshita discloses the use of a modified ethylenic random copolymer of ethylene and a $C_3$ to $C_{10}$ alpha-olefin grafted with a $C_3$ to $C_{10}$ unsaturated carboxylic acid or anhydride or ester thereof as a modifier.

A modifier is not necessarily a compatibilizer, thus the use as a modifier means that the blend produced is binary rather than the preferred ternary blend produced by compatibilization. Modifiers can improve tack and typically improve dynamic properties at room temperature. Indeed, modifiers tend to behave much like plasticizers or lubricants. Compatibilizers, on the other hand, have the ability to alter the interfacial situation of an incompatible blend which results in synergistic improvement of blend properties at both room temperatures and at high end use temperatures. The effect of compatibilizers is similar to that of surfactants having the ability to mix oil and water which is often referred to as "emulsification effect" in the field of colloids. The role of the compatibilizer in an elastomer blend is manifold: (1) reduce the interfacial energy between the phases, (2) permit a finer dispersion during mixing, (3) provide a measure of stability against gross phase segregation, and (4) result in improved interfacial adhesion.

Chem Abstract 70995 B/39 of J54106-554 discloses an EPDM co-grafted with styrene and a polar monomer as an additive for EPDM or EP/NBR blends. U.S. Pat. No. 4,605,704 to Eastman discloses grafted EPDM for various polymer blends including glassy, crystalline, rubbery polymers and mixtures thereof.

EPA 270 247 discloses a blend composition of polyamide, polyphenylene ether, and a compatibilizer of modified rubberlike material.

U.S. Pat. No. 4,730,833 discloses a method for making EPDM-g-PMMA.

U.S. Pat. No. 3,833,689 to Usamoto discloses blends of a curable elastomer and an alpha-olefin/acrylic ester copolymer.

Each of U.S. Pat. No. 4,730,833; EPA 270,247; 4,605,704; 9,908,411; 4,397,987; 3,833,689 are herein incorporated by reference as if fully set forth.

In addition, U.S. Pat. No. 4,307,204 to DuPont discloses an expandable, curable elastomeric sponge composition based on ethylene/propylene/diene terpolymer (EPDM) elastomer or polychloroprene elastomer, which composition further contains a minor amount of an ionomer resin which is an ethylene polymer or copolymer containing at least about 50 mole percent acid functional groups, which groups are at least 50% neutralized by metal ions. These acid-modified ethylene polymers, which may also include acid-modified EPDM terpolymers, are disclosed to improve the balance of curing and expanding properties of the polymer composition when used to prepare cured expanded materials.

Japanese Abstract 87-318671/45 discloses nitrile rubber blended with an ethylene alpha-olefin copolymer which can have an amine group, a hydroxy group, an epoxy group, a carboxy group or an anhydride group.

SUMMARY OF THE INVENTION

New compatibilizers and methods for compatibilizing dissimilar elastomer blends and compatibilized compositions are disclosed herein. Further, compatibilizers for polar/nonpolar blends and compatibilized compositions of polar/nonpolar elastomers and a compatibilizer are provided.

In one aspect of the invention, EPDM or EP modified or grafted with functional groups, has been found to compatibilize polar/nonpolar elastomer blends, including, but not limited to, neoprene/EPDM; or neoprene/EP; nitrile/EPDM; or nitrile/EP, thereby improving the overall properties of the blends. Further, in another aspect of the invention, an ethylene copolymer such as ethylene/methacrylate (EMA) or ethylene vinyl acetate (EVA) is blended with polar and/or nonpolar elastomers as a compatibilizer. Another aspect of the invention provides for compatibilized blends of polar/nonpolar elastomers. Some of these include, but are not limited to, nitrile rubber or neoprene rubber blended with EPDM or EP and a compatibilizer and vulcanizates of these blends having, among other properties, improved heat, ozone and cut growth resistance. Some of these embodiments comprise a compatibilized blend of:

(1) nitrile or neoprene rubber;
(2) EPDM or EP rubber; and
(3) 1 to about 15 phr of a compatibilizer.

The compatibilizer may be an ethylene copolymer such as EMA or EVA, or an EPDM or EP grafted with an alkyl methacrylate wherein the alkyl is has 1 to 12 carbon atoms. Particularly useful are ethylene vinyl acetate, and ethylene methacrylate and EP or EPDM grafted with methyl methacrylate. The blends of this invention may be readily co-vulcanized and formed into shaped, heat, ozone, cut growth and oil resistant articles such as automotive drive belts and automotive hoses. These articles not only exhibit, among other properties, improved heat, ozone and cut growth resistance, but also have retained or enhanced physical properties such as, but not limited to, abrasion resistance, modulus, elongation and tensile strength.

The rubbers and the compatibilizer may be blended, formed, or otherwise mixed by any one of a number of suitable methods.

The rubbers useful in this invention include: ethylene/propylene rubber, (EP), ethylene/propylene/diene terpolymer, (EPDM), polychloroprene, (neoprene or CR rubber), butadiene rubber (BR), styrene/butadiene rubber (SBR), natural rubber (NR), nitrile rubber (NBR) and polyisoprene rubber (IR), butyl, halobutyl, poly(isobutylene-co-4-methyl styrene), and brominated poly(isobutylene-co-4-methyl styrene) rubber.

The EP rubbers useful in this invention are random copolymers of ethylene and propylene where the copolymer has an ethylene content of 30 to 85 wt. %, based upon the weight of the copolymer. The EP copolymer can be produced by the well known Zeigler-Natta polymerization method.

The EPDM Rubbers to be compatibilized in this invention are random copolymers of ethylene/propylene and a diene, where the ethylene is present at 35–80 wt. %, and the diene is present at 0 to 15 wt. %, based upon the weight of the copolymer. The EPDM polymer can be produced by the well known Zeigler-Natta polymerization method. The dienes useful in producing EPDM copolymers are typically 1,4-hexadiene, alkylidene norbornenes, etc.

The neoprene rubbers useful in this invention are polymers of chloroprene. These can be produced by the well known free radical polymerization method. The nitrile rubbers useful in this invention are polymers with acrylonitrile and butadiene made by a well known free radical polymentation process.

In a particular aspect of the invention, the functionalized EPDM or EP rubbers of this invention are useful for compatibilizing nitrile or neoprene/EP and nitrile or neoprene/EPDM blends.

DETAILED DESCRIPTION OF THE INVENTION

In one aspect this invention provides a process for compatibilizing rubber blends comprising blending a compatibilizer with two or more different rubbers. Preferably this invention relates to a process for compatibilizing dissimilar or polar/nonpolar rubber blends comprising, blending a compatibilizer with two or more synthetic or natural rubbers. The compatibilizer can be an ethylene acrylic copolymer (particularly EMA) or ethylene vinylic copolymer (particularly EVA), or an EP or EPDM grafted with an alkyl methacrylate wherein the alkyl is independently $C_1$ to $C_{12}$.

Another aspect of this invention relates to compatibilized compositions of two or more rubbers, and a compatibilizer. In particular, this invention relates to compatibilized rubber blends comprising, an ethylene acrylic or vinylic copolymer such as EMA or EVA or an EPDM or EP functionalized with an alkyl methacrylate and at least two dissimilar rubbers.

Another aspect of this invention provides a new approach for compounding rubber blends using compatibilizers such as ethylene acrylic or vinylic copolymers or grafted EP copolymer or EPDM terpolymer as a compatibilizer. The inventor has found that these compatibilizers are excellent agents for compatibilizing polar/nonpolar elastomer blends, including but not limited to, neoprene/ethylene-propylene rubber; neoprene/ethylene-propylene-diene rubber; nitrile/ethylene propylene rubber; nitrile/ethylene propylene-diene rubber blends.

Some of the compatibilizers of this invention comprise acrylate functionalized EP or EPDM. The term EPDM or EP as used herein, unless otherwise indicated, includes terpolymers, tetrapolymers, etc., preferably of ethylene, and a $C_3$–$C_{28}$ alpha-olefin, typically propylene, and/or a non-conjugated diolefin or mixtures of such diolefins which may also be used. The amount of the non-conjugated diolefin will generally range from about 0.5 to 20 wt. percent, preferably about 1 to about 7 wt. percent, based on the total amount of ethylene and alpha-olefin present.

Representative examples of non-conjugated dienes that may be used as the third monomer in the terpolymer include:

a. Straight chain acrylic dienes such as: 1,4-hexadiene; 1,5-heptadiene; 1,6-octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymenec.

c. Single ring alicyclic dienes such as: 1,4-cyclo-hexadiene; 1,5-cyclooctadiene; 1,5-cyclododecadiene; 4-vinylcyclohexene; 1-allyl, 4-isopropylidene cyclo-hexane; 3-allyl-cyclopentene; 4-allyl cyclohexene and 1-isopropenyl-4-(4-butenyl) cyclohexane.

d. Multi-single ring alicyclic dienes such as: 4,4'-dicyclo-pentenyl and 4,4'-dicyclohexenyl.

e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethylidene norbornene; 5-methylene-6-methyl-2-norbornene; 5-methylene-6, 6-dimethyl-2-norbornene; 5-propenyl-2-norbornene; 5-(3-cyclo-pentylidene)-2-norbornene and 5-cyclohexylidene-2-norbornene; etc.

The most preferred EPDM elastomer contains from about 60 to about 80% by weight ethylene, from about 15 to about 35% by weight propylene and from about 3 to about 7% by weight of non-conjugated diene. Synthesis of EPDM is well known in the art. G. ver Strate, *Encyclopedia of Polymer Science and Engineering*, vol. 6, 2nd Ed., 1986, p. 522–564.

Synthesis of graft copolymers has assumed a great importance to prepare both high impact resins, additives as adhesion promoters and compatibilizing agents for plastic alloys etc. These products can be prepared by radical polymerization of the monomer in the presence of polymer that has to be modified, operating in solution or in aqueous suspension or emulsion. Grafting techniques have been well documented in literature, which indicate that it is possible to obtain graft copolymers with very good mechanical properties by polymerizing vinylic or acrylic monomers onto an elastomer previously dissolved in an aliphatic or aromatic solvent or a mixture of both.

To produce grafted compatibilizers of this invention, the EP or EPDM is grafted with a functional monomer, typically an acrylic ester group, the functional monomer being selected from alkyl methacrylates (alkyl=$C_1$ to $C_{12}$).

The graft reaction of the EP or EPDM with the functional monomer can be carried out in the presence of a free radical source. The EP or EPDM may be grafted with the alkyl methacrylate (MMA for example) at temperature generally less than 300° C., preferably from about 80° C.–250° C., in the presence of free radical sources. Suitable free radical sources are, for example, peroxides such as benzoyl peroxide, ditertiary butyl peroxide, tertiary butyl hydroperoxide, tertiary butyl peroxypivalate, cumene hydroperoxide, cumene hydroperoxide, p-menthane peroxide, p-menthane hydroperoxide compounds or azo compounds, such as azobis (isobutyronitrile), or irradiation sources. Suitable irradiation sources include, for example, those from cobalt, uranium, thorium, and the like and ultraviolet light. The amount of peroxide or free radical agent used is generally quite low being of the order of about 0.01 to about 0.5 percent based on the weight of the EP or EPDM. The reaction may be carried out in a batchwise manner from about 1 to about 24 hours.

The amount of functional monomer or derivative thereof incorporated into the EP or EPDM polymer according to this invention may generally range from about 1 to 50 percent by weight, preferably from about 1 to about 30 percent by weight, and most preferably from about 1 to about 20 percent by weight, based on the weight of EP or EPDM polymer. The modified EP or EPDM polymers used in this invention are solid materials having a number average molecular weight (Mn) in the range of from about 15,000 up to about 150,000, more preferably from about 25,000 up to about 90,000, as measured by Gel Permeation Chromatography (GPC).

Other compatibilizers used in this invention comprise ethylene vinylic copolymers, preferably, ethylene vinyl acetate. The vinylic monomer, preferably vinyl acetate, is typically present at 5 to 60 weight %, preferably 20 to 50 weight %, based upon the weight of the copolymer. The melt index of an ethylene vinylic compolymer compatibilizer of this invention is typically less than 30 dg/min, preferably less than 25 dg/min, even more preferably less than 10 dg/min, most preferably less than 5 dg/min, as measured by ASTMD-1238.

In yet another aspect of this invention, a compatibilized blend of an ethylene vinylic copolymer with a nonpolar and a polar rubber is provided. A process for compatibilizing dissimilar rubber blends comprising, blending a compatibilizing amount of ethylene vinylic copolymer, particularly EVA, with a polar elastomer and a nonpolar elastomer is also provided.

EVA's useful in this invention are available from EXXON Chemical Company under the trade name Escorene ™.

Other compatibilizers used in this invention comprise ethylene acrylic copolymers preferably ethylene methacrylate, wherein preferably, ethylene methacrylate. The methacrylate is typically present at 5 to 60 weight %, preferably 20 to 50 weight %, based upon the weight of the copolymer. The melt index of an ethylene acrylic copolymer compatibilizer of this invention is typically less than 30 dg/min, preferably less than 20 dg/min, more preferably less than 10 dg/min, particularly less than 5 dg/min, as measured by ASTMD-1238.

Ethylene acrylic copolymers useful in this invention are available from Exxon Chemical Company under the trade name OPTEMA ™.

In another embodiment of this invention, compatibilized rubber blends of a nonpolar elastomer with a polar elastomer and an alkyl methacrylate copolymer are provided. A process for compatibilizing a polar/nonpolar rubber blend comprising blending a polar rubber with a nonpolar rubber and a compatibilizing amount of an ethylene/acrylic copolymer is also disclosed.

The polyolefins, modified EP or EPDM, elastomers, elastomer blends, and/or the compatibilized blend may, if desired, include one or more other well known additives such as, for example antioxidants, ultraviolet absorbers, antistatic agents, release agents pigments, colorants, or the like; however, this should not be considered a limitation of the present invention.

The rubbers which can be compatibilized using these terpolymers, include, but are not limited to ethylene/propylene rubber, neoprene, nitrile rubber, ethylene/propylene/diene terpolymers, SBR, Butyl, halobutyl, poly (isobutylene-co-4-methylstyrene), brominated poly (isobutylene-co-4-methyl styrene), natural rubber and the like.

The term EPDM or EP as used herein, unless otherwise indicated, includes terpolymers, tetrapolymers, etc., preferably of ethylene, and a $C_3$–$C_{28}$ alpha-olefin, preferably propylene and/or a non-conjugated diolefin or mixtures of such diolefins which may also be used. The amount of the non-conjugated diolefin will generally range from about 0.5 to 20 wt. percent, preferably about 1 to 7 wt. percent, based on the total amount of ethylene and alpha-olefin present.

Representative examples of non-conjugated dienes that may be used as the third monomer in the terpolymer include:

a. Straight chain acyclic dienes such as : 1,4-hexadiene; 1,5-heptadiene; 1,6-octadiene.

b. Branched chain acyclic dienes such as: 5-methyl-1, 4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as : 1,4-cyclohexadiene; 1,5 cyclooctadiene; 1,5-cyclododecadiene; 4-vinylcyclohexene; 1-allyl, 4-isopropylidene cyclo-hexane; 3-allyl-cyclopentene; 4-ally cyclohexene and 1-isopropenyl-4-(4-butenyl) cyclohexane.

d. Multi-single ring alicyclic dienes such as: 4,4″-dicyclo-pentenyl and 4,4″-dicyclohexenyl.

e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethylidene norbornene; 5-methylene-6-methyl-2-norbornene; 5-methylene-6, 6-dimethyl-2-norbornene; 5-propenyl-2-norbornene; 5-(3-cyclo-pentylidene)-2-norbornene and 5-cyclohexylidene-2-norbornene; etc.

The most preferred EPDM elastomer contains from about 60 to about 80% by weight ethylene, from about 15 to about 35% by weight propylene and from about 3 to about 7% by weight of non-conjugated diene. Synthesis of EPDM is well known in the art. G. ver Strate, *Encyclopedia of Polymer Science and Engineering*, vol. 6, 2nd Ed., 1986, p. 522–564.

The polychloroprene elastomer used as the major component in the elastomer blend in one embodiment of the present invention is a commercially available material, commonly referred to as CR or neoprene rubber. It is available in a number of grades and molecular weights, all of which elastomeric grades are suitable for use in the compositions of this invention. The preferred grade is Neoprene GRT which is more resistant to crystallization and is based on a copolymer of chloroprene and 2,3-dichloro-1,3-butadiene. Neoprene synthesis is also well known in the art. (C. A. Hargraves et al., *Encyclopedia of Polymer Science and Technology*, vol. 3, p. 705–730).

As indicated above, the polychloroprene preferably constitutes the major component of the mixture of elastomers of the present invention, but may be generally present in a range of from about 30 to 90% by weight based on total elastomer content.

It is also within the scope of the present invention to provide elastomer compositions based on blends of the polychloroprene and other polar rubbers.

The vulcanizable composition of the present invention also includes a conventional mixed vulcanizing system for EP or EPDM and polychloroprene. Generally such vulcanizing systems include a metal oxide such as zinc oxide, magnesium oxide and mixtures thereof, used either alone or mixed with one or more organic accelerators or supplemental curing agents such as an amine, a phenolic compound, a sulfonamide, thiazole, a thiuram compound, thiourea or sulfur. Organic peroxides may also be used as curing agents. The zinc or magnesium oxide is normally present at a level of from about 1 to about 10 parts by weight per 100 parts by weight of elastomer blend, and the sulfur and supplemental curing agents or curing accelerators, where used, may be present at a level of from about 0.1 to about 5 parts by weight per 100 parts by weight of elastomer blend.

The elastomers blend composition of this invention may also contain other additives such as lubricants, fillers, plasticizers, tackifiers, coloring agents, blowing agents, and antioxidants.

Examples of fillers include inorganic fillers such as carbon black, silica, calcium carbonate, talc and clay, and organic fillers such as high-styrene resin, coumarone-indene resin, phenolic resins, lignin, modified melamine resins and petroleum resins.

Examples of lubricants include petroleum-type lubricants such as oils, paraffins, and liquid paraffins, coal tar-type lubricants such as coal tar and coal tar pitch; fatty oil-type such as castor oil, linseed oil, rapeseed oil and coconut oil; tall oil; waxes such as beeswax, carnauba wax and lanolin; fatty acids and fatty acid salts such as Ticinoleic acid, palmitic acid, barium stearate, calcium stearate and zinc laurate; and synthetic polymeric substances such as petroleum resins.

Examples of plasticizers include hydrocarbon oils, e.g. paraffin, aromatic and naphthenic oils, phthalic acid esters, adipic acid esters, sebacic acid esters and phosphoric acid-type plasticizers.

Examples of tackifiers are petroleum resins, coumarone-indene resins, terpene-phenol resins, and xylene/formaldehyde resins.

Examples of coloring agents are inorganic and organic pigments.

Examples of the blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, calcium amide, p-toluenesulfonyl azide, salicyclic acid, phthalic acid and urea.

The compatibilized elastomers blend composition of this invention, may be prepared and blended on any suitable mixing device such as an internal mixer (Brabender Plasticorder), a Banbury Mixer, an extruder, a kneader or a similar mixing device.

The nonpolar elastomer, for example EP or EPDM rubber, to be compatibilized is typically present at about 10 to 90 phr, more preferably 15 to 50 phr, most preferably 20 to 40 phr. The compatibilizer is typically present at 0.1 to 60 phr, more preferably 1 to 30 phr, most preferably 5 to 20 phr. The polar elastomer, for example CR or NBR, is typically present at 10 to 90 phr, preferably 30 to 80 phr, more preferably 40 to 70 phr (phr meaning parts per hundred rubber).

Blending temperatures and times may range from about 45° to 180° C. and from about 1 to 10 minutes respectively. After forming a homogeneous mixture of the elastomers and optional fillers, processing aids, antioxidants and the like, the mixture is then vulcanized by the further mixing-in of crosslinking agents and accelerators followed by heating the resulting blend to a temperature of from about 100° to 250° C., more preferably from about 125° to 200° C. for a period of time ranging from about 1 to 60 minutes. Molded articles including but not limited to belts, hoses, air springs & power transmission belts are prepared by shaping the prevulcanized formulation using an extruder or a mold, and subjecting the composition to temperatures and curing times as set forth above.

The materials utilized in the examples are described below:

(A) Neoprene (CR) GRT is a polychloroprene made by DuPont.

(B) Vistalon 7000 (abbr. V 7000) is a fast curing, high diene ethylene-propylene terpolymer (EPDM), available from EXXON CHEMICAL COMPANY, with a Mooney viscosity ML(1+4) @ 125° C. of 60 and an ethylene content of 70 wt. %.

(C) N650 and N762 are two well known, general purpose, moderately reinforcing carbon blacks. They are standard as defined by ASTM D 1765-89 and are manufactured by a number of different companies including: Continental Carbon, J. M. Huber, Phillips Chemical, Columbian Chemicals, Cabot, and Ashland Chemical.

(D) Octamine is an antioxidant used primarily with CR, NR, and SBR. It gives excellent protection against heat, oxygen, and flexing. Chemically, it is a reaction product of diphenyl-amine and diisobutylene. It is manufactured by Uniroyal Chemical.

(E) AgeRite HP-S is an antioxidant used in rubber compounding (similarly to Octamine). It is a blend of dioctylated diphenylamines and diphenyl-p-phenylene-diamine and is manufactured by R. T. Vanderbilt.

(F) Maglite D is a magnesium oxide, which is used as a curing agent in our compound. It is manufactured by C. P. Hall and Merck Chemical.

(G) Paracril B is a Nitril Rubber (Poly (butadiene co-acrylonitrile) available from Uniroyal.

(H) OPTEMA TC 110 A commercial EMA produced by Exxon; 21.5 wt. % MA, MI=2.0 dg/min (I) OPTEMA XV 53.04 A commercial EMA produced by Exxon; 33 wt. % MA, MI=4 dg/min (J) Escorene 502 An experimental EVA produced by Exxon; 38 wt. % VA, MI=4 dg/min (K) Escorene 503 A commercial EVA produced by Exxon; 42 wt. % VA, MI=4 dg/min (L) Escorene UL 7765 A commercial EVA produced by Exxon. 27.5 wt. % VA, MI=2.4 dg/min The foregoing more general discussion of this invention will be further exemplified by the following specific examples offered by way of illustration and not limitation of the above-described invention.

The testing conditions and procedures used are set forth in Table 1 below

TABLE 1

| Test | Testing Conditions | Procedure |
|---|---|---|
| 1. Mooney Viscosity (ML) | (1 + 8) @ 100 C. | ASTM D 1646 |
| 2. Mooney Scorch (MS) | 132 C. | ASTM D 1646 |
| 3. Oscilating Disk Rheometer (ODR) | 160 C. +3 arc No preheat 100 cycles/min 30 min rotor | ASTM D 2084-88 |
| 4. Procedures for mixing standard compounds and preparing standard vulcanized sheets | Pads Cured for 20 min @ 160 C. | ASTM D 3182-89 |
| 5. Modulus, Tensile, Elongation | — | ASTM D 412 |
| 6. Hardness (Durometer) | Shore A | ASTM D 2240 |
| 7. Air Oven Age | 140 C. for 48 96 hr. | ASTM D 573 |
| 8. Dynamic Ozone Resistance | 100 pphm ozone 37.8 C. Method A 30 cycles/min 0-25% extension | ASTM D 3395-86 |
| 9. Melt Flow Rate | (10 kg 230 C.) | ASTM D 1238 |
| 10. Density | | ASTM D 792 |

EXAMPLES

I

EPDM-g-PMMA

1. The reaction vessel (1L, 3 neck, jacketed resin kettle equipped with a reflux condenser, thermometer, and a mechanical stirrer) was charged with cyclohexane (525 g) and Vistalon 7000 (75 g) and was heated to 80° C., with stirring, under nitrogen atmosphere, overnight to obtain a viscous solution. Methyl methacrylate (90 g) was added to the hot reaction mixture and was mixed well, with stirring. The initiator, t-butyl peroxypivalate (1.8 g, 7.5 mmol of peroxide group) was added to the reaction mixture and the reaction was continued for six and half hours at 80° C. under nitrogen atmosphere with stirring, to maintain a mild reflux. The reaction mixture was then allowed to cool to ambient temperature and was poured into methanol (600 ml). The insoluble polymer was kneaded and the solvent was drained off. A translucent white solid polymer (160 g, 97%) was obtained after drying the insoluble polymer in a vacuum oven (32"Hg, 60° C.) overnight. Other ingredients are set forth as in Example 1 above.

The compatibilizer EPDM-g-PMMA, (reaction product, obtained by the above synthetic procedure as such without further purification), was compounded with neoprene using a small scale Brabender (Volume=45 cc), maintaining processing conditions as rpm=60, temperature: 110° C., time of mixing=10 min. The blend samples were examined in the optical microscope as thin sections (100-200 nm) using phase contrast. The blends were also examined in the scanning electron microscope, after staining with OSO4, using a Robinson backscattering detector. Analysis of both light microscopic and SEM data indicated that the binary blend, CR/EPDM-g-PMMA had the smallest zone and particle sizes of the dispersed phase ≦1 micrometer, and the ternary blend, CR/EDPM/EPDM-g-PMMA, 70/20/10 had above particle sizes in the range of 1-3 micrometers. In either case, the above blends had better phase dispersion than the corresponding control blend, CR/EPDM, 70/30 which had particle size of the dispersed phase in the range of 5-10 micrometer. These results indicated that EPDM-g-PMMA had better interfacial adhesion with CR which resulted in reduced particle size of the dispersed phase in the above blends. In other words, both the binary blend, CR/EPDM-g-PMMA, 70/30 and the ternary blend CR/EPDM/EPDM-g-PMMMA, 70/20/10 had improved compatibility which was better than that of the control, CR/EPDM, 70/30. The blends are set out in Table II below.

TABLE II

| BLEND | NEOPRENE | EPDM | EPDM-g-PMMA |
|---|---|---|---|
| 1 | 70 | 30 | — |
| 2 | 70 | — | 10 |
| 3 | 70 | 20 | 10 |

To demonstrate the beneficial effect of the compatibilizer, EPDM-g-PMMA in improving other mechanical properties of neoprene/EPDM blends, a simple test method was developed using the same ratio of curing agents and antioxidants but excluding the fillers such as carbon black and oil, the blends (shown in table III) were compounded with antioxidants (octamine=2.5 phr, agerite HPS=0.5 phr) and stearic acid (2 phr) in a small scale C. W. Brabender (45 cc) at 110° C. for about 5 minutes. The blended material was then cooled to 50° C. and the curing agents (Magelite D=4 phr, zinc oxide=5 phr) were added and the mixing continued for an additional five minutes. The accelerated material was then cured by placing it into a mold and pressing for about 20 minutes at 160° C. Test specimens (tensile dumbbells) were died out from the material. Room temperature and heat aged tensiles were run using the Monsanto tensometer. The ozone resistance was recorded using a dynamic mode, following an ASTM (D 3395-86) procedure. Large quantities of the said graft copolymer were synthesized as before and were purified by solvent extraction using acetone and heptane in sequence. The chemical identity of each fraction was confirmed by analyzing the FTIR spectral data. The acetone soluble fraction (35 wt. %) was recovered and was identified as the homopolymer PMMA. Analysis of the FTIR spectral data of both heptane soluble and insoluble fractions (25 and 40 wt. % respectively) indicated the presence of strong absorption peaks at 1725 cm$^{-1}$ which was due to the "C=O" group in the PMMA chains. Thus, both fractions contained the PMMA grafts linked to the EPDM backbone.

The compatibility effect of both heptane soluble and insoluble fractions with neoprene and neoprene/EPDM 70/30 blends were also investigated using the above test method and the results are included in Table IV. Selected blend samples were examined in the optical microscope as before. The poor dispersion and lager domain Sizes (≧12-25 micrometer) of the dispersed phase (V 7000 or heptane insoluble fraction of the graft copolymer) indicated the incompatibility of the neoprene/EPDM (70/30) blend and neoprene/EPDM-g-PMMA (heptane insoluble) blend. On the contrary, significant improvement in the phase morphology, better dispersion and smaller domain size (≦1 micrometer) clearly indicated the improved compatibility of neoprene/EPDM-g-PMMA (heptane soluble) 70/30 blends.

The above compatibility effect was also evident in terms of the significant improvement in tensile properties, heat aging, and dynamic ozone resistance of those blends containing EPDM-g-PMMA (heptane soluble). The results also indicated that only small amount (10 wt. %) of the graft copolymer, EPDM-g-PMMA (heptane soluble) was required to bring out the beneficial effects of the compatibilization in neoprene/EPDM/EPDM-g-PMMA (heptane soluble) 70/20/10 blend.

TABLE III

Neoprene/V 7000/V 7000-g-PMMA (Heptane Soluble) Blends

| Components/ Properties | Blend # | | | | |
|---|---|---|---|---|---|
| | 1 | 2 | 3 | 4 | 5 |
| Neoprene | 100 | 70 | 70 | 70 | 70 |
| EPDM (V 7000) | — | 30 | 20 | 10 | — |
| EPDM-g-PMMA (Heptane Soluble) | — | — | 10 | 20 | 30 |
| Physical Properties Cure 20 Min., 160° C. | | | | | |
| Tensile MPa | 13.3 | 7.7 | 10 | 12.1 | 12.8 |
| Elongation % | 726 | 570 | 600 | 640 | 712 |
| Heat Aged, 48 Hr., 148° C. | | | | | |
| Tensile MPa | 5.0 | 7.0 | 8.0 | 11.9 | 12.1 |
| Elongation % | 275 | 396 | 385 | 489 | 556 |
| Dynamic Ozone Resistance 100 ppm $O_3$, 37.8° C., 0–25% Extension, 30 Cycle/Min. Hours to Crack | 144 | 168 | 336 | >480 | >480 |

•all blends contained:
stearic acid = 2 phr.
octamine = 2.5 phr.
agerite HPS = 0.5 phr.
magelite = 4 phr.
zinc oxide = 5 phr.

2. The graft copolymer, EPDM-g-PMMA was synthesized as above and was used without any purification. The NBR/EPDM-g-PMMA blends (Table IV) were compounded using a small scale (45 cc) Brabender mixer and blend samples were examined in the optical microscope as thin sections (100–200 nm) using phase contrast. A better dispersion and smaller particle size (=1 micrometer) of EPDM-g-PMMA in NBR matrix indicated improved compatibility of the above graft copolymer with NBR. However, the graft copolymer sample contained some ungrafted EPDM which resulted in some larger particle size and almost a bimodal dispersion of the graft copolymer in the above blends. The gradual decrease in particle size with increasing amount of EPDM-g-PMMA in blends of 5–7 is also a good indication of the improved compatibility effect of the graft copolymer in the above blends. The blends are set out in Table IV.

TABLE IV

| BLEND | NBR | EPDM | EPDM-g-PMMA |
|---|---|---|---|
| 1 | 50 | 50 | — |
| 2 | 50 | — | 50 |
| 3 | 70 | 30 | — |
| 4 | 70 | — | 30 |
| 5 | 45 | 45 | 10 |
| 6 | 40 | 40 | 20 |
| 7 | 70 | 20 | 10 |

II

EVA

3. The same procedure disclosed above was utilized. The Blends are shown in Table V below.

The blends were compounded using a small scale (45 cc) Brabender mixer and blend samples were examined in the optical microscope as thin sections (110–200 nm) using phase contrast. Comparing various neoprene/EVA, 70/30 blends, one of the EVA copolymers, containing 40% VA, had a significant effect, i.e., almost complete miscibility of said blend was observed.

In the case of ternary blends, i.e., Neoprene/EPDM/EVA, 70/20/10 blends, a range of morphological behavior, ranging from discontinuous to almost co-continuous morphology was observed.

TABLE V

| | Blend Components | | | | |
|---|---|---|---|---|---|
| BLEND # | CR | EPDM | EVA (9%) | EVA (18%) | EVA (40%) |
| 1 | 70 | 30 | — | — | — |
| 2 | 70 | — | 30 | — | — |
| 3 | 70 | — | — | 30 | — |
| 4 | 70 | — | — | — | 30 |
| 5 | 70 | 20 | 10 | — | — |
| 6 | 70 | 20 | — | 10 | — |
| 7 | 70 | 20 | — | — | 10 |

III

EMA

5. The same procedure disclosed above was utilized. The blends are listed in Table VI below. The blends were compounded using a small scale (45 cc) Brabender Mixer and blend samples were examined in the optical microscope as thin sections (100–200 nm) using phase contrast, CR/E-MA, 70/30 blend had a better dispersion and small particle size of the E-MA phase in CR matrix. Interestingly, the blend CR/V 7000, 70/20/10 exhibited almost a co-continuous morphology, which was not observed in the control blend CR/V 7000, 70/30

TABLE VI

| BLEND #1 | NEOPRENE | EPDM | E-MA* |
|---|---|---|---|
| 1 | 70 | 30 | — |
| 2 | 70 | — | 30 |
| 3 | 70 | 20 | 10 |

*E-MA = Optema XS 61.08, available from EXXON Chemical Company.

The beneficial effect of certain selected EVA (Escorene UL 7765, EX 502, EX 503, etc.) and EMA (Optema, TC 110, XY 53-04 etc.) copolymers in terms of improved mechanical properties of the neoprene/EPDM blends as shown in Table VII below. Examination of the results indicated that the addition of EPDM (V 7000) alone (i.e. 70/30 binary blend) decreased the tensile and elongation because of incompatibility of neoprene and EPDM. However, the addition of small amounts (10 parts by weight) of the said copolymers helped to bring these properties back up. In other words the neoprene/EPDM 70/30 is an "incompatible" blend with poor physical properties. However, the neoprene/EPDM/EVA or EMA 70/20/10 blends are "compatible" blends with improved physical properties. Also the beneficial effects of the compatibilization are evident in terms of the significant improvements in heat aging and dynamic ozone resistance, as depicted in Table VII.

TABLE VII

| | NEOPRENE/V 7000/EMA OR EVA COPOLYMER BLENDS | | | | | | |
|---|---|---|---|---|---|---|---|
| COMPONENTS | 1 | 2 | 3 | 4 | 5 | 6 | 7 |
| Neoprene | 100 | 70 | 70 | 70 | 70 | 70 | 70 |
| V 7000 | — | 30 | 20 | 20 | 20 | 20 | 20 |
| TC 110 (EMA) | — | — | 10 | — | — | — | — |
| XV 53.04 (EMA) | — | — | — | 10 | — | — | — |
| UL 7765 (EVA) | — | — | — | — | 10 | — | — |
| Ex 502 (EVA) | — | — | — | — | — | 10 | — |
| Ex 503 (EVA) | — | — | — | — | — | — | 10 |
| PHYSICAL PROP. | | | | | | | |
| Tensile MPa Cure 20 Min. at 160° C. | 16.2 | 10.1 | 11.5 | 10.5 | 19.4 | 13.3 | 9.8 |
| Elongation % Cure 20 Min. at 160° C. | 736 | 657 | 670 | 690 | 728 | 800 | 720 |
| Tensile MPa Heat Aged, 48 Hr. at 148° C. | 4.8 | 6.2 | 9.8 | 10.0 | 15.0 | 13.8 | 9.7 |
| Elongation % Heat Aged, 48 Hr. at 148° C. | 278 | 399 | 513 | 547 | 573 | 583 | 511 |
| DYNAMIC OZONE RESISTANCE Hours to Crack 100 pphm O3, 37.8° C. 0–25% Extension 30 cycle/min. | 144 | 168 | — | >500 | 168 | >500 | >500 |

*all blends contained:
stearic acid = 2 phr.
octamine = 2.5 phr.
agerite HPS = 0.5 phr.
magelite = 4 phr.
zinc oxide = 5 phr.

It is apparent from the foregoing description, the materials prepared and the procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

What is claimed is:

1. A process for compatibilizing elastomer blends comprising blending:
   1) polychloroprene;
   2) a nonpolar elastomer of ethylene-propylene rubber (EP) or ethylene-propylene-diene rubber (EPDM); with 0.1 to 60 phr of a compatibilizer having a number average molecular weight in the range of from about 15,000 to 150,000 consisting essentially of the heptane soluble portion of a alkyl methacrylate grafted EP or EPDM, said alkyl group having 1 to 12 carbon atoms.

2. The process of claim 1 where the nonpolar elastomer is ethylene-propylene-diene rubber.

3. The process of claim 1 wherein the alkyl methacrylate of the modified EPDM or EP is present from 1 to 60 wt %, based upon the weight of the graft polymer.

4. The process of claim 1 wherein the alkyl methacrylate is methyl methacrylate.

5. The process of claim 1 wherein the compatibilizer is present in the blend from 0.1 to 15 phr.

6. The process of claim 1 wherein the compatibilizer is present from 5 to 20 phr.

7. A process to improve heat aged properties of a chloroprene elastomer blend comprising blending:
   1) polychloroprene;
   2) a nonpolar elastomer of ethylene-propylene rubber (EP) or ethylene-propylene-diene rubber (EPDM); with 0.1 to 60 phr of a compatibilizer having a number average molecular weight in the range of from about 5,000 to 150,000 consisting essentially of the heptane soluble portion of a alkyl methacrylate grafted EP or EPDM, said alkyl group having 1 to 12 carbon atoms.

8. The process of claim 1 where the polychloroprene is present at about 10 to about 90 phr.

9. The process of claim 1 where the nonpolar elastomer is ethylene-propylene rubber.

10. The process of claim 1 where the nonpolar elastomer is present at about 10 to about 90 phr.

11. The process of claim 1 where the polychloroprene is present at 30 to 80 phr, the nonpolar elastomer is present at about 15 to 50 phr and the compatibilizer is present at 1 to 30 phr.

12. The process of claim 1 where the polychloroprene is present at 40 to 70 phr, the nonpolar elastomer is present at about 20 to 40 phr and the compatibilizer is present at 0.1 to 20 phr.

* * * * *